US012083547B2

(12) United States Patent
Cheng

(10) Patent No.: US 12,083,547 B2
(45) Date of Patent: Sep. 10, 2024

(54) SPRINKLER

(71) Applicant: YUAN MEI CORP., Changhua County (TW)

(72) Inventor: Chi-Han Cheng, Changhua County (TW)

(73) Assignee: YUAN MEI CORP., Changhua County (TW)

( * ) Notice: Subject to any disclaimer, the term of this patent is extended or adjusted under 35 U.S.C. 154(b) by 449 days.

(21) Appl. No.: 17/469,890

(22) Filed: Sep. 9, 2021

(65) Prior Publication Data

US 2023/0008209 A1 Jan. 12, 2023

(30) Foreign Application Priority Data

Jul. 8, 2021 (TW) ................................ 110125135

(51) Int. Cl.

| | |
|---|---|
| ***B05B 15/652*** | (2018.01) |
| ***B05B 3/02*** | (2006.01) |
| ***B05B 3/04*** | (2006.01) |
| ***B05B 15/625*** | (2018.01) |

(52) U.S. Cl.

CPC ............ *B05B 15/652* (2018.02); *B05B 3/021* (2013.01); *B05B 3/044* (2013.01); *B05B 15/625* (2018.02)

(58) Field of Classification Search

CPC ....... B05B 3/021; B05B 3/044; B05B 15/625; B05B 15/652; A01G 25/02

USPC ......................................... 239/242, 562, 566

See application file for complete search history.

(56) References Cited

U.S. PATENT DOCUMENTS

| | | | |
|---|---|---|---|
| 2,943,796 | A | 7/1960 | Smith |
| 3,767,118 | A | 10/1973 | Oberto et al. |
| 3,907,204 | A | 9/1975 | Przystawik |
| 4,205,785 | A | 6/1980 | Stanley |
| 4,245,786 | A | 1/1981 | Abrahamsen et al. |
| 4,912,782 | A | 4/1990 | Robbins |
| 5,022,588 | A | 6/1991 | Haase |
| 5,305,956 | A | 4/1994 | Wang |
| 5,511,727 | A | 4/1996 | Heren et al. |
| 5,628,458 | A | 5/1997 | Kuo |
| 5,730,366 | A | 3/1998 | DeWitt |
| 5,845,850 | A | 12/1998 | Guo et al. |
| 6,334,577 | B1 | 1/2002 | Chih |
| 6,568,603 | B2 | 5/2003 | Chao et al. |
| 6,676,041 | B1 | 1/2004 | McLoughlin et al. |
| 6,736,340 | B1 | 5/2004 | Wang |
| 7,055,537 | B2 | 6/2006 | Elick et al. |
| 7,111,795 | B2 | 9/2006 | Thong |
| 7,114,666 | B2 | 10/2006 | Luettgen et al. |

(Continued)

*Primary Examiner* — Cody J Lieuwen

(74) *Attorney, Agent, or Firm* — Xuan Zhang

(57) ABSTRACT

A sprinkler includes a base, a tubular body disposed on the base, at least one control assembly mounted to the tubular body, and at least one nozzle set which has a plurality of nozzles aligned in a row and is disposed on the tubular body. The control assembly includes at least one push portion mounted with at least one connecting member which is pivotally connected to at least one guiding member with a plurality of sliding slots. The sliding slots are inserted by the nozzles for allowing the nozzles to be moved back and forth selectively. By movement of the push portion in an axial direction of the tubular body caused by manual operation, the guiding member is also moved radially to drive at least one of the nozzles to incline in turn.

10 Claims, 11 Drawing Sheets

(56) References Cited

U.S. PATENT DOCUMENTS

| | | | | |
|---|---|---|---|---|
| 7,252,246 | B2 | 8/2007 | Heren et al. | |
| 7,472,847 | B2 | 1/2009 | Mukai et al. | |
| 7,607,590 | B2 | 10/2009 | Nies | |
| 7,740,186 | B2 | 6/2010 | Macan et al. | |
| D620,552 | S | 7/2010 | Mayher | |
| 7,909,266 | B2 | 3/2011 | Lo | |
| 8,177,147 | B2 | 5/2012 | Engel | |
| 8,529,226 | B2 | 9/2013 | Li | |
| 8,998,108 | B2 | 4/2015 | Hsieh | |
| 9,085,003 | B2 | 7/2015 | Dodson | |
| 9,289,783 | B2 * | 3/2016 | Wang | B05B 15/652 |
| 9,724,708 | B2 | 8/2017 | Helmsderfer et al. | |
| 10,456,795 | B2 | 10/2019 | Wen | |
| D898,866 | S | 10/2020 | Lauer | |
| 2011/0095101 | A1 * | 4/2011 | Wang | B05B 15/652<br>239/443 |
| 2017/0181600 | A1 | 6/2017 | Blanchard et al. | |
| 2017/0245727 | A1 | 8/2017 | Blanchard et al. | |
| 2017/0273429 | A1 | 9/2017 | Nicolson et al. | |
| 2020/0094283 | A1 * | 3/2020 | Duong | B05B 3/044 |
| 2020/0230627 | A1 * | 7/2020 | Chen | B05B 3/16 |

* cited by examiner (II)

SPRINKLER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a sprinkler, especially to a sprinkler which includes a plurality of nozzles for spraying water in multiple directions and being applied to different places such as lawn, garden, etc.

Description of Related Arts

Generally, a sprinkler includes an operation member used to control a plurality of water streams flowing toward different direction. Compared with the conventional fixed-type sprinkler which sprays water in single direction, the sprinkler with operation member provides more spray area and the water sprayed covers larger area. Refer to U.S. Pat. Nos. 9,289,783, and 10,076,758, the sprinkler includes a plurality of flexible nozzle tubes aligned in a row and each of the nozzle tubes is operable to tilt at different angle with respect to the sprinkler. In U.S. Pat. No. 9,289,783, an adjustment piece swings to drive the nozzle tubes moving and tilting at different angles in transverse and longitudinal directions for providing various sprinkling patterns. In U.S. Pat. No. 10,076,758, an adjustment piece controls and guide a plurality of nozzles tubes correspondingly and the adjustment piece swings so as to drive the plurality of nozzles tubes moving at an angle and different water distribution patterns are provided.

SUMMARY OF THE PRESENT INVENTION

Therefore, it is a primary object of the present invention to provide a sprinkler which is operated in an axial direction for driving and guiding nozzles radially to move and incline. Thus the sprinkler is more convenient to use and different spray patterns are provided.

In order to achieve the above object, a sprinkler which includes including a tubular body, at least one control assembly, and at least one nozzle set according to the present invention is provided. One end of the tubular body is connected to an external component for allowing fluid flowing therein while the control assembly is disposed on one end of the tubular body and the nozzle set formed by a plurality of nozzles aligned in a row is fitted on the tubular body.

The control assembly includes at least one push portion and at least one guiding member.

The push portion is arranged at the tubular body and the guiding member includes one end pivotally connected to the push portion and the other end pivotally mounted to the tubular body. Thus the guiding member is capable of being moved radially around a pivot point where the guiding member is pivotally connected to the tubular body.

A guiding slot is formed on an extension area of the guiding member, arranged slantwise and located on one side of a central line of the guiding member in lengthwise direction. A pivot pin is disposed on one end of the push portion and capable of being pivotally mounted and moved in the guiding slot. The guiding member is pushed to move radially by the movement of the pivot pin. A plurality of sliding slots aligned in a row and inclined at an angle in turn are formed on the guiding member. The plurality of the nozzles are inserted through the plurality of sliding slots correspondingly and selectively moved back and forth in the sliding slots toward one direction. The push portion is operated to move in an axial direction of the tubular body and further drives the guiding member to move radially within limited distance. Thus at least one of the nozzles is pushed to incline selectively in turn.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
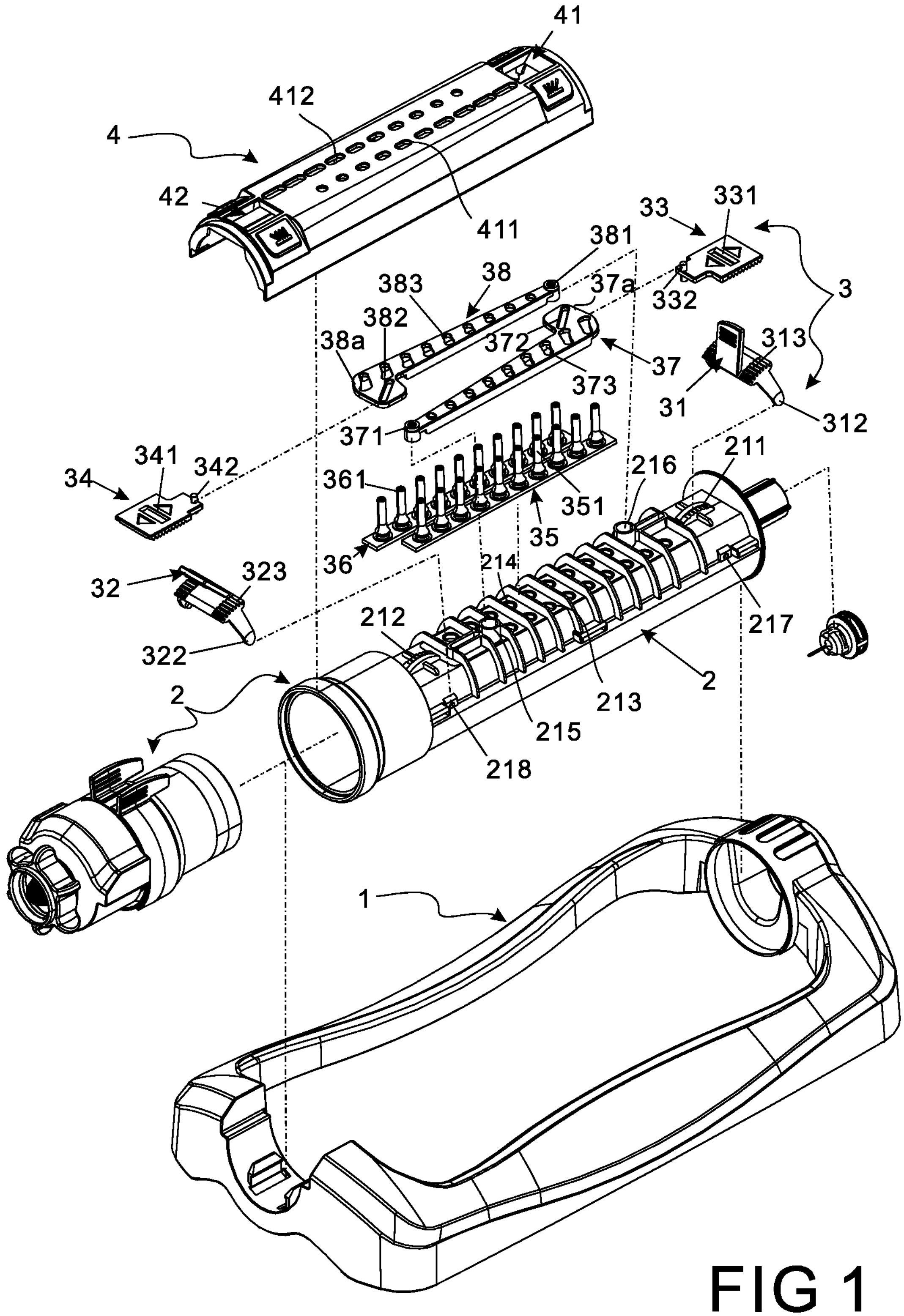
FIG. 1 is an exploded view of an embodiment according to the present invention.

In order to learn features and functions of the present invention, please refer to the following embodiments.

The following are only a few embodiments of the present invention and used for providing thorough and complete understanding of the scope of the present invention, not intended to limit the present invention. In the figures, the same reference signs represent the same component, The terms used in the present specification are used only to illustrate the present invention and don't intend to limit the present invention. For example, at least one or a plurality of components in the embodiment indicated by the first and the second are used to explain and describe the assembly of the components more conveniently, even other embodiments or other type of structure and/or method. The terms such as "above", "under,", "front", "rear", "side", "longitudinal", "transverse", "upward", "downward", "forward", "backward", "sideward", "left", "right", "horizontal", "vertical", "rear end", "adjacent", "parallel", "incline", "close to", "radial", "10 degrees", "20 degrees", "30 degrees", "crossed over", etc. are used to describe arrangement, movement and positions of the components shown in the figure.

Refer to FIG. 1-6, a sprinkler of the present invention includes a base 1, a tubular body 2 disposed on the base 1, at least one control assembly 3 mounted to the tubular body 2, and a cover 4 covering the tubular body 2. The cover 4 having a shape which matches the tubular body 2 for covering the tubular body 2. One end of the tubular body 2 is connected to an external component for allowing fluid flowing therein. At least one assembly portion and at least one abutting portion are extended from positions close to least one outer end of the tubular body 2 and located close to each other. In this embodiment, there are two assembly portions including a first assembly portion 217 and a second assembly portion 218, and two abutting portions including a first abutting portion 211, and a second abutting portion 212. At least one bushing is arranged closed to the assembly portion 217, 218. In this embodiment, there are a first bushing 215 and a second bushing 216. A plurality of assembly holes 213, 214 aligned in a row are extended from one end of the tubular body 2 with the first bushing 215 and the second bushing 216 to the other end of the tubular body 2 respectively.

Figure 5:
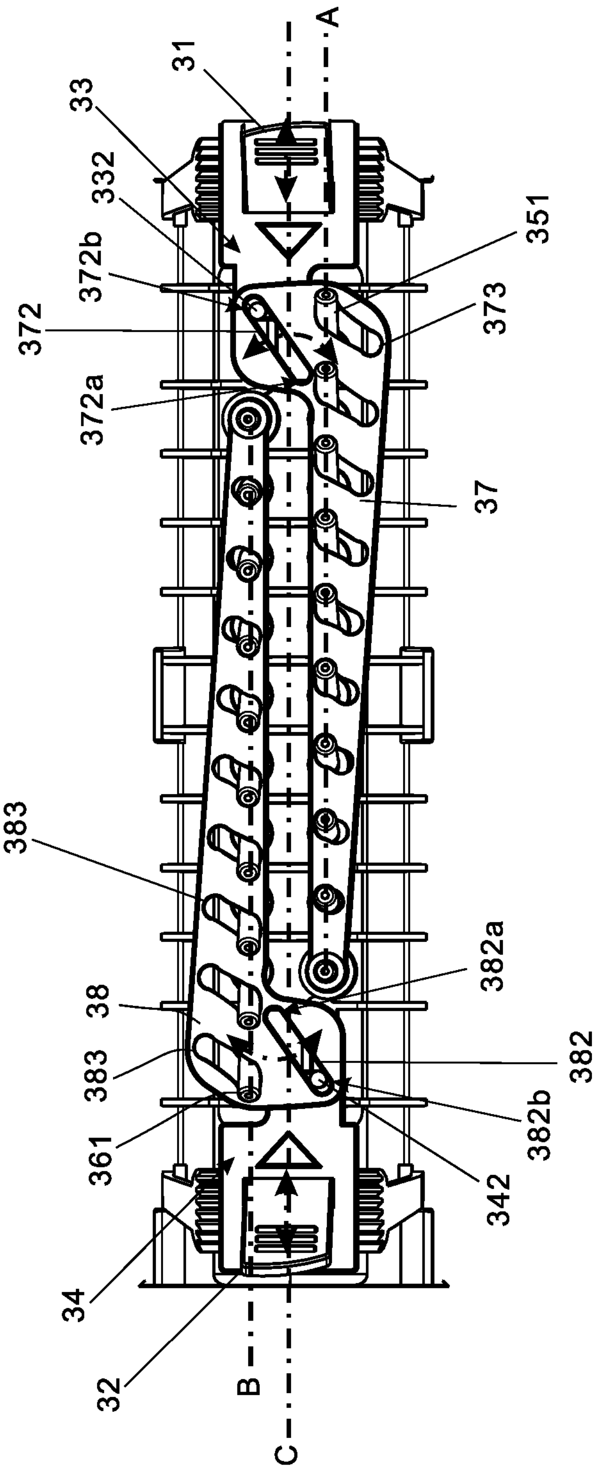
FIG. 5 is a partial top view showing a control assembly assembled with a tubular body of an embodiment according to the present invention.
Figure 6:
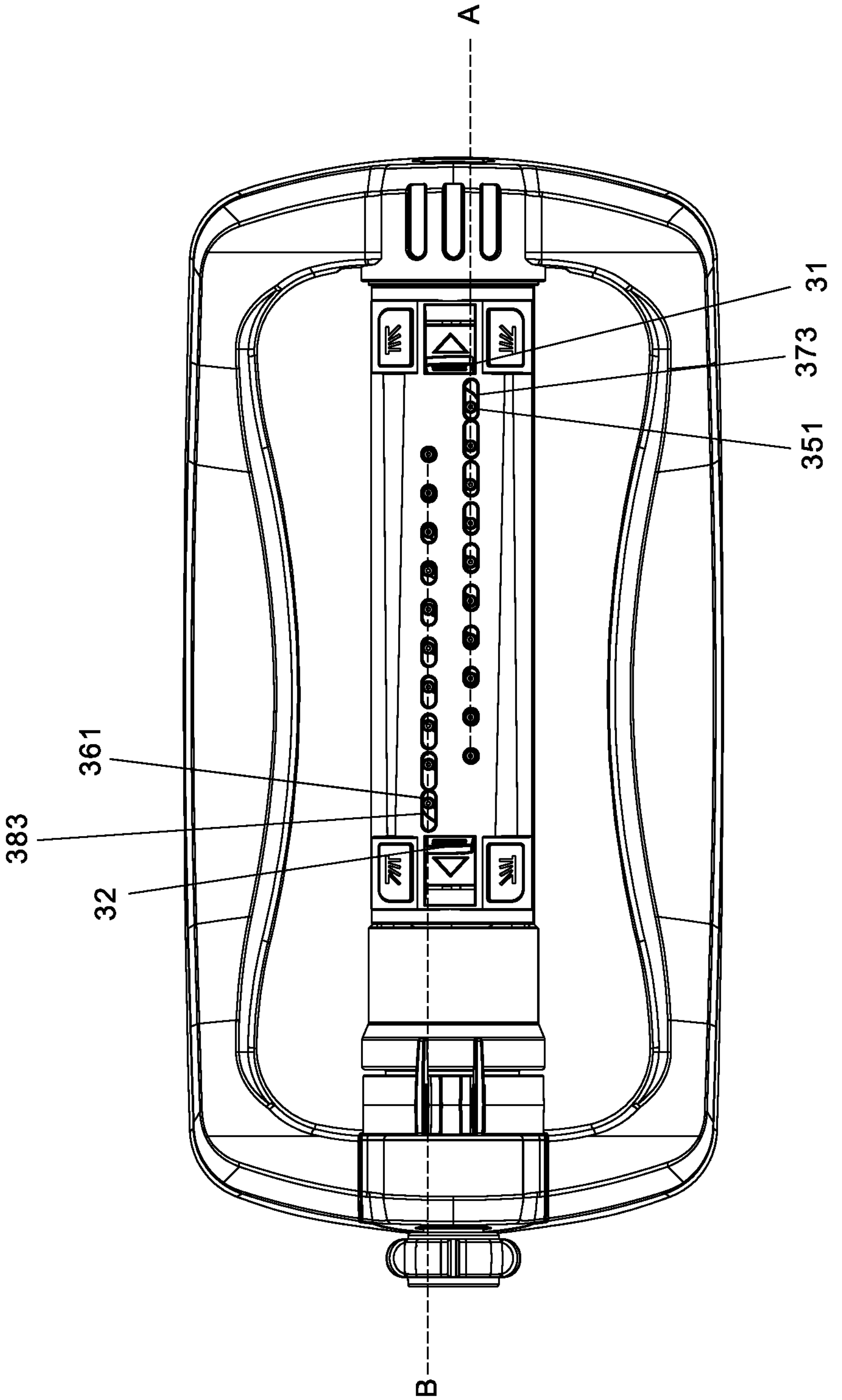
FIG. 6 is a top view of an embodiment according to the present invention.

The control assembly 3 includes at least one push portion, at least one connecting member, and at least one guiding member, all arranged at the tubular body 2. In this embodiment, the control assembly 3 includes a first push portion 31, a second push portion 32, a first connecting member 33, a second connecting member 34, a first guiding member 37, and a second guiding member 38. One end of the first guiding member 37 and one end of the second guiding member 38 are provided with a first pivot tube 371 and a second pivot tube 381 respectively while a first surface **37*a* and a second surface 38*a* are extending from one side of the other end of the first guiding member 37 and one side of the other end of the second guiding member 38 respectively. A first guiding slot 372 and a second guiding slot 382 are arranged slantwise of the first surface 37*a* and the second surface 38*a* respectively. A plurality of inclined first sliding slots 373 are aligned in a row and located between the first pivot tube 371 and the first surface 37*a* while there are also a plurality of inclined second sliding slots 383 are aligned in a row and located between the second pivot tube 381 and the second surface 38*a*. Refer to FIG. 5 and FIG. 6, the first sliding slots 373 aligned in a row are inclined at an angle with respect to a first longitudinal line A and the length of the respective first sliding slots 373 is gradually increased in turn from the first pivot tube 371 to the first surface 37*a*. Similarly, the second sliding slots 383 aligned in a row are inclined at an angle with respect to a second longitudinal line B and the length of the respective second sliding slots 383 is gradually increased in turn from the second pivot tube 381 to the second surface 38*a*, as shown in FIG. 5**.

The push portion 31, 32 is an operation component of the control assembly 3 and a pivot pin is extended from the push portion 31, 32. For example, a first pivot pin 312 and a second pivot pin 322 are extended downward from one end of the first push portion 31 and one end of the second push portion 32 respectively. A first active portion 313 and a second active portion 323 are formed on each of two sides of the first push portion 31 and the second push portion 32 respectively.

The first connecting member 33 and the second connecting member 34 are provided with a first locking slot 331 and a second locking slot 341 respectively while a first pivot pin 332 and a second pivot pin 342 are extending and projecting from one end of the first locking slot 331 and one end of the second locking slot 341 respectively.

At least one nozzle set is fitted on the tubular body 2. In this embodiment, there are two nozzle sets, a first nozzle set 35 and a second nozzle set 36. The first nozzle set 35 and the second nozzle set 36 are formed by a plurality of nozzles 351 aligned in a row and a plurality of nozzles 361 aligned in a row respectively. The nozzles 351, 361 which are flexible and spaced from each other are inserted through the assembly holes 213, 214 respectively. One end of each of the nozzles 351, 361 is projecting from a surface of the tubular body 2 and the fluid from the tubular body 2 is selectively provided to the respective nozzles 351, 361.

A plurality of mounting holes 411, 412 which are corresponding to the nozzles 351, 361 are formed on the cover 4 so that the nozzles 351, 361 are inserted through the mounting holes 411, 412 respectively, projecting from and exposed outside a surface of the cover 4. Two ends of the cover 4 are provided with two receiving slots 41, 42 in which the first and second push portions 31, 32 are mounted respectively so that the first and second push portions 31, 32 are capable of being moved in an axial direction of the tubular body 2 in the receiving slots 41, 42 respectively.

Refer to FIG. 2-5 in turn, how the control assembly 3 is mounted to the tubular body 2 is revealed. The first pivot pin 312 of the first push portion 31 and the second pivot pin 322 of the second push portion 32 are pivotally connected to the first assembly portion 217 and the second assembly portion 218 of the tubular body 2 respectively. Thereby the first push portion 31 and the second push portion 32 are radially rotated around first assembly portion 217 and the second assembly portion 218 which are used as pivot points on the tubular body 2.

The first sliding slots 373 of the first guiding member 37 and the second sliding slots 383 of the second guiding member 38 are aligned with and arranged over the nozzles 351 and the nozzles 361 respectively for enclosing the nozzles 351 and nozzles 361 partially. The first pivot tube 371 and the second pivot tube 381 are mounted in the first bushing 215 and the second bushing 216 respectively so that the first guiding member 37 and the second guiding member 38 can move radially around the first bushing 215 and the second bushing 216 which are used as pivot points respectively. By radial movement of the first guiding member 37 and the second guiding member 38, the nozzles 351, 361 are driven to move and incline within the first sliding slots 373 and the second sliding slots 383 respectively.

Figure 2:
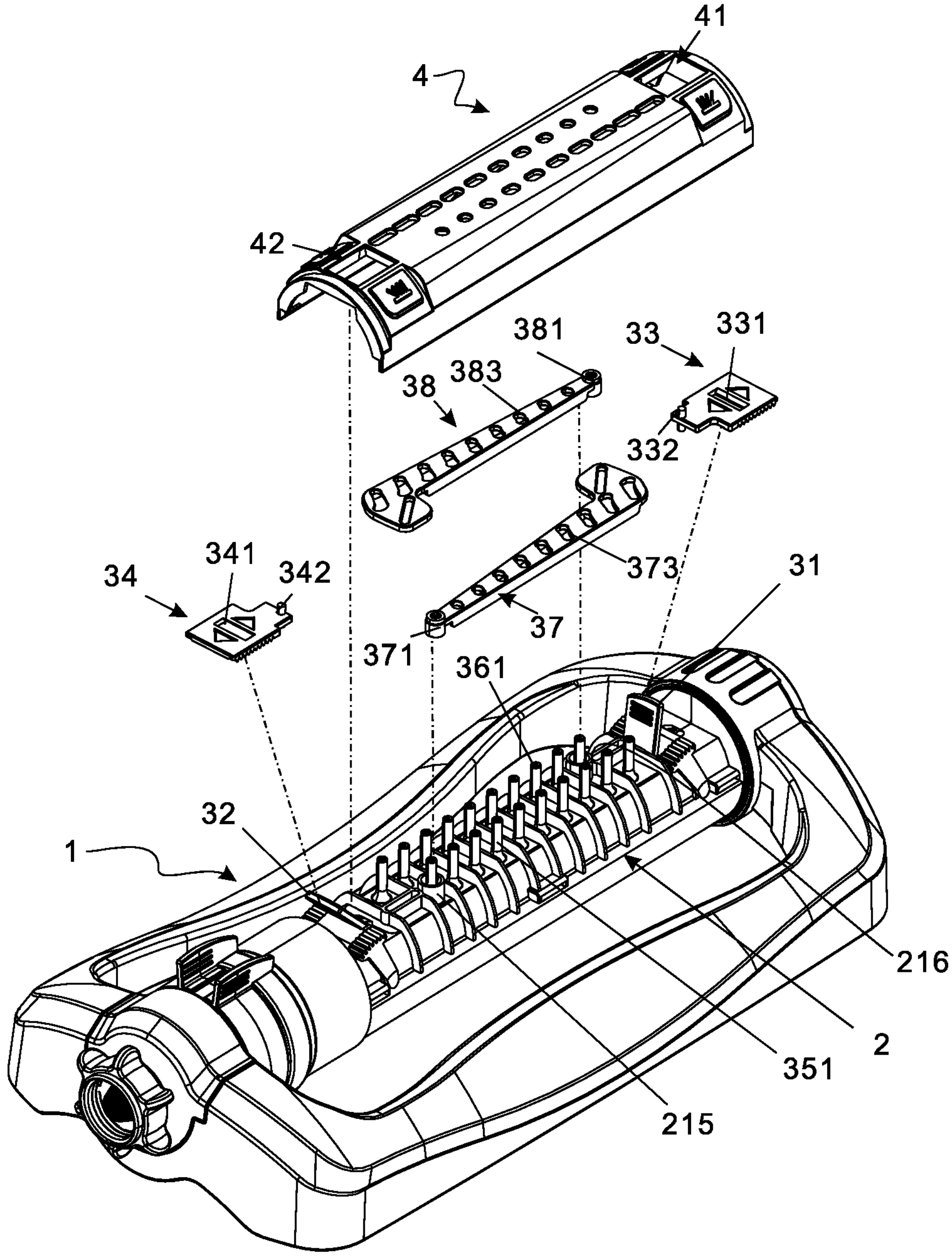
FIG. 2 is a partially exploded view of an embodiment according to the present invention.

As shown in FIG. 1, FIG. 2 and FIG. 5, the first locking slot 331 of the connecting member 33 and the second locking slot 341 of the second connecting member 34 are mounted to the first push portion 31 and the second push portion 32 respectively while the first pivot pin 332 and the second pivot pin 342 are mounted in the first guiding slot

372 of the first guiding member 37 and the second guiding slot 382 of the second guiding member 38 respectively.

Lastly, the receiving slots 41, 42 of the cover 4 are aligned with and fitted on the first and second push portions 31, 32 respectively and so are the mounting holes 411, 412 on the nozzles 351, 361. Thereby the cover 4 is covering and located over the tubular body 2.

Figure 3:
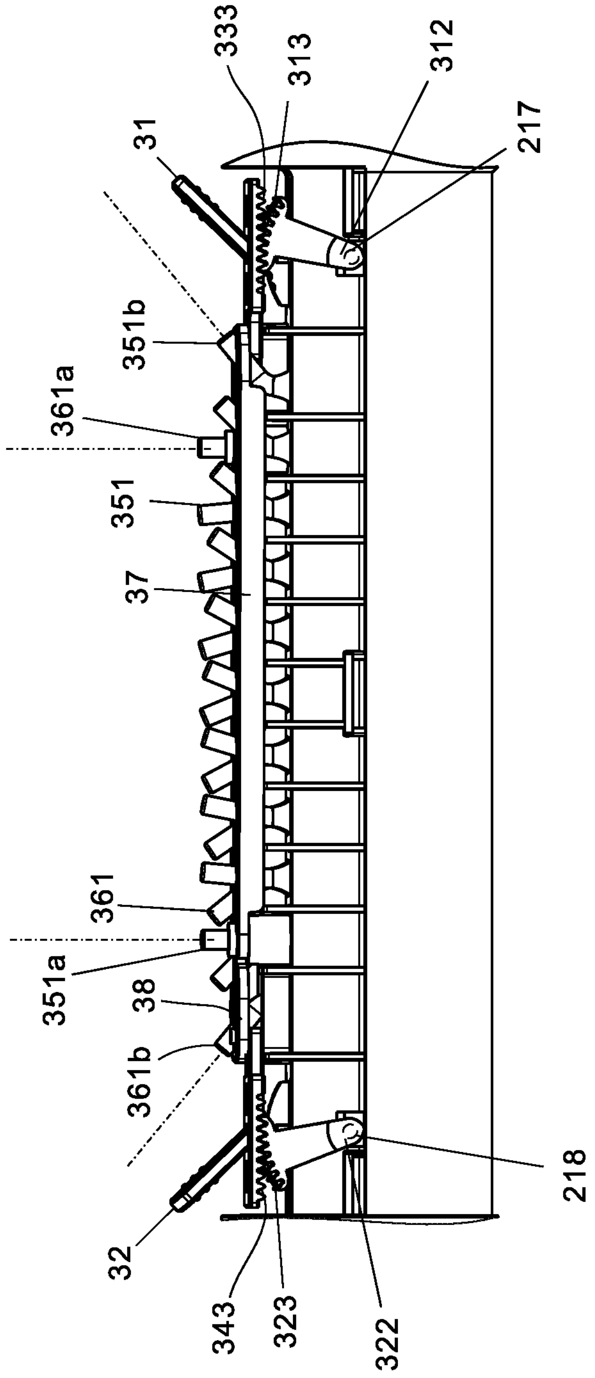
FIG. 3 is a schematic drawing showing a side view of a control assembly mounted to a tubular body of an embodiment according to the present invention.
Figure 4:
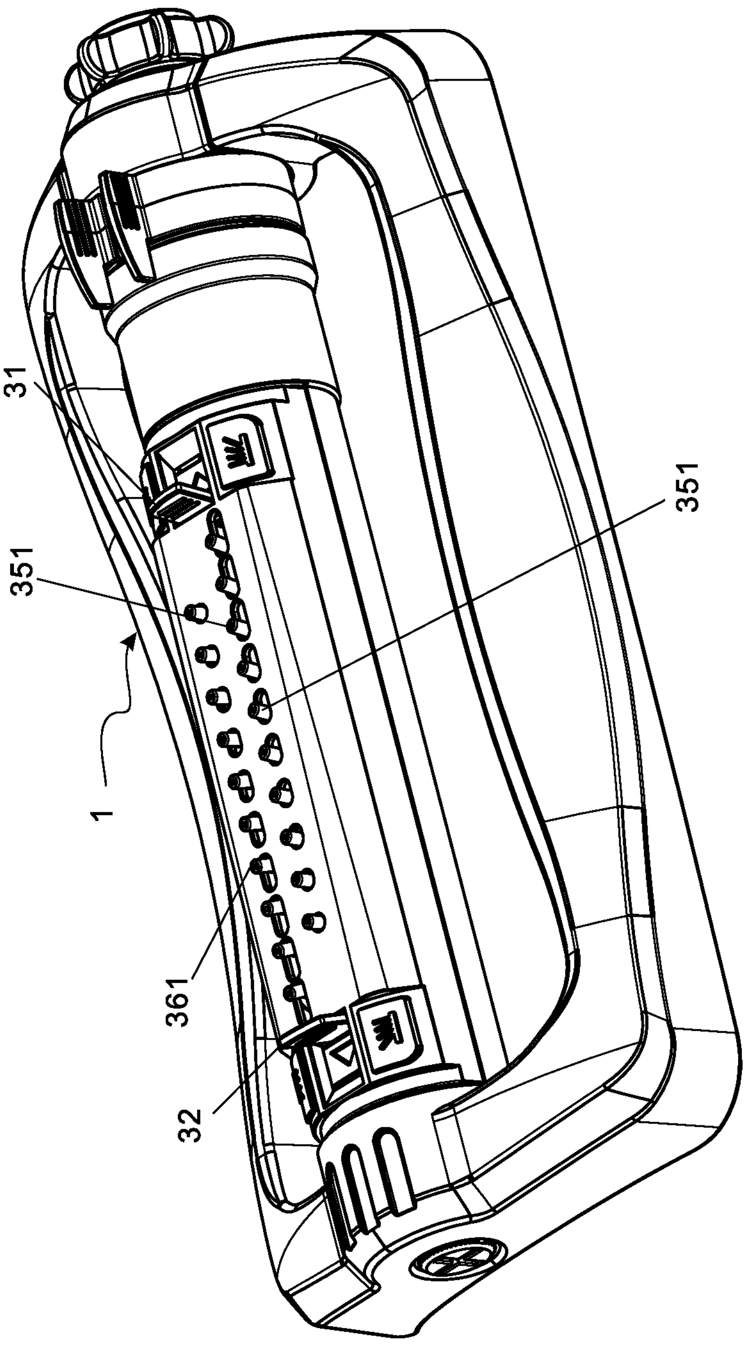
FIG. 4 is a perspective view of an embodiment according to the present invention.

Refer to FIG. 3, a first passive part 333 and a second passive part 343 are disposed under the first connecting member 33 and the second connecting member 34 respectively and abutting against the first active portion 313 and a second active portion 323 respectively. The first and second active portions 313, 323 are having a toothed curve while the first and second passive parts 333, 343 are having a toothed surface so that the first and second active portions 313, 323 are engaged with the first and second passive parts 333, 343 for assistance in driving the first and second connecting members 33, 34 to move back and forth when the first and second push portions 31, 32 are moved. As shown in FIG. 1, the first abutting portion 211 and the second abutting portion 212 provide support to the first push portion 31 and the second push portion 32 while the first and second push portions 31, 32 are rotating.

As shown in FIG. 5 and FIG. 6, radial movement of the first guiding member 37 and the second guiding member 38 as well as lines along which the nozzles 351, 361 move are explained by means of the first longitudinal line A and the second longitudinal line B. For example, the nozzles 351 and the nozzles 361 are moved slantingly due to the first sliding slots 373 of the first guiding member 37 and the second sliding slots 383 of the second guiding member 38 respectively and they are also moved linearly along the first longitudinal line A and the second longitudinal line B respectively. In the first sliding slots 373 and the second sliding slots 383, the nozzles 351 and the nozzles 361 are selectively moved back and forth along the first longitudinal line A and the second longitudinal line B respectively. The first push portion 31 or the second push portion 32 is capable of being manually operated and pushed longitudinally along an axis C of the tubular body 2 so that the first and second connecting members 33, 34 are also driven to push and move the first and second guiding members 37, 38 within limited distance radially. Then at least one of the nozzles 351 and at least one of the nozzles 361 are selectively to be inclined longitudinally with respect to the first longitudinal line A and the second longitudinal line B respectively.

In another embodiment (not shown in figures), at least one push portion and at least one connecting member are integrated into one part. For example, the push portion is integrally formed on the connecting member so that the two component become a single operating element. In order to match such arrangement, at least one end of the tubular body 2 is provided with at least one track (not shown in figures) for allowing the operating element to move therein in an axial direction of the tubular body 2. The track can be a track with a mounting hole, a track with a raised area, or replaced by a pivot shaft.

The guiding members are arranged in a pair and corresponding to each other in the embodiment. They can also be disposed in a linear or a staggered manner. By various arrangements of a plurality of guiding members, the present sprinkler provides different spray patterns. For example, a plurality of guiding members are mounted linearly, crossed over one another, or in parallel. Thereby different spray patterns are created such as crossed spray pattern, oblique spray pattern toward the same direction, vertical spray pattern, oblique spray pattern in the opposite directions created by at least two sets of nozzles.

The operation modes of the present device are explained in the following with reference of three embodiments and FIG. 7-12. An angle of inclination of the nozzles 351, 361 at different stages are under control of the longitudinal movement of the first and second push portions 31, 32 being operated respectively. The following operation modes are only for demonstration and there are many other modifications. For example, in some other embodiments, the first push portion 31 or the second push portion 32 can be arranged at different positions according to user's needs. The angle of inclination angle of the nozzles 351, 361 being pushed by radial movement of the first and second guiding members 37, 38 which are driven by the first and second connecting members 33, 34 respectively can also be changed according to user's requirements.

Figure 10:
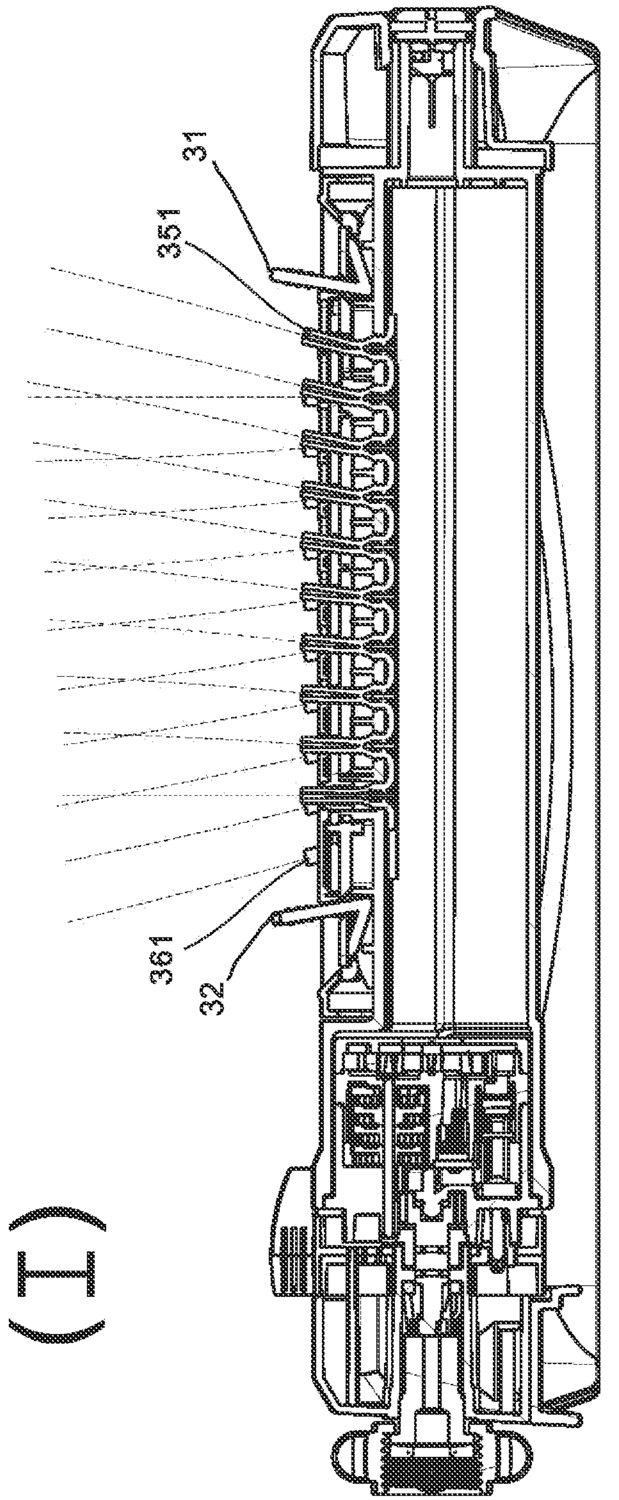
FIG. 10 is a sectional view of the first embodiment in FIG. 7 showing inclination angles and a spray pattern of nozzle sets at two sides according to the present invention.

Refer to FIG. 7-10, a first embodiment (I) is disclosed. The first connecting member 33 is driven to move by the first push portion 31 being operated and moved to the first position. Then the first pivot pin 332 is pushed and moved to a first end **372*a* of the first guiding slot 372 while the first guiding member 37 is also driven to move a bit radially at the same time. At the moment, the first guiding member 37 further drives the nozzles 351 to incline at an angle of 0-10 degrees with respect to a vertical plane in turn. Among the nozzles 351, a nozzle 351*a* remains vertical while the rest nozzles 351 are gradually inclined at a larger angle in turn and a nozzle 351*b* has the maximum angle of inclination so as to form a fan shape at one side. The second push portion 32 is operated and moved to the first position for driving the second connecting member 34 to move. Then the second pivot pin 342 is driven and moved to a first end 382*a* of the second guiding slot 382 while the second guiding member 38 is also driven to move a bit radially at the same time. At the moment, the second guiding member 38 further drives the nozzles 361 to incline at an angle of 0-10 degrees with respect to a vertical plane in turn. Among the nozzles 361, a nozzle 361*a* remains vertical while the rest nozzles 361 are gradually inclined at a larger angle in turn and a nozzle 361*b* has the maximum angle of inclination so as to form a fan shape at one side. As shown in FIG. 10, the nozzles 351 and the nozzles 361** are inclined in opposite directions so that the water is sprayed in a double-fan-shaped pattern and in a staggered manner.

Figure 7:
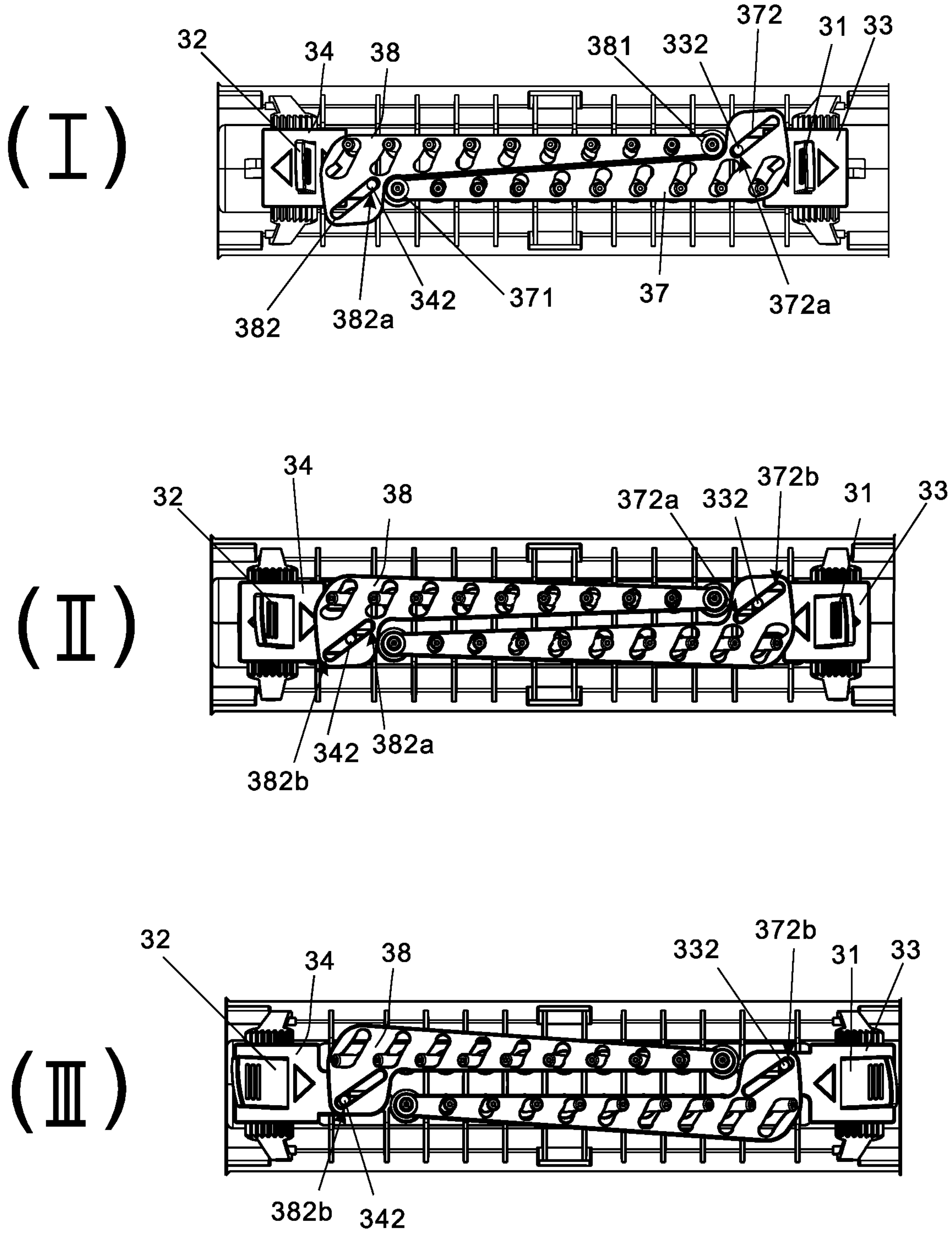
FIG. 7 are top views of three embodiments showing movement of guiding members in a tubular body according to the present invention.
Figure 8:
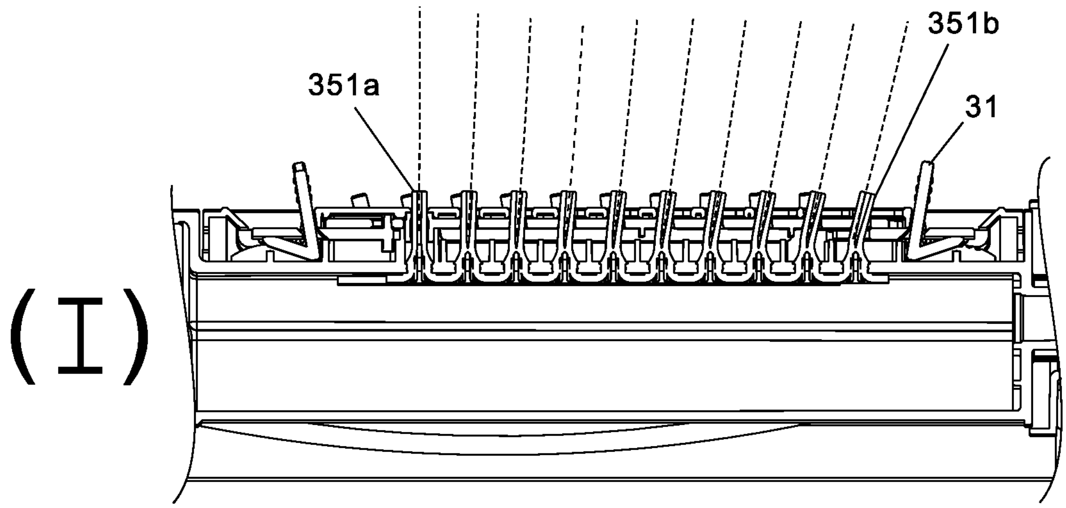
FIG. 8 is a sectional view of the first embodiment in FIG. 7 showing inclination angles and a spray pattern of a nozzle set at one side according to the present invention.
Figure 9:
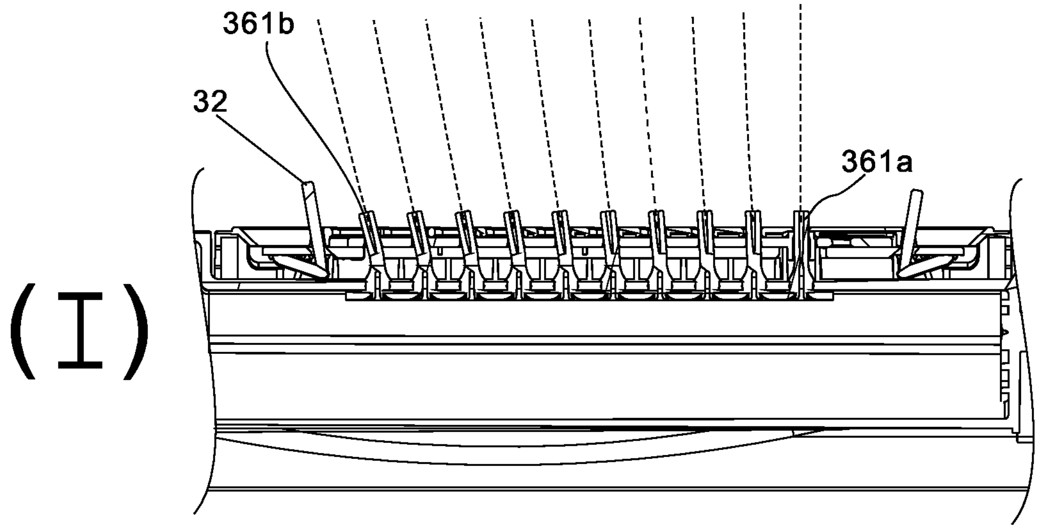
FIG. 9 is another sectional view of the first embodiment in FIG. 7 showing inclination angles and a spray pattern of a nozzle set at the other side according to the present invention.
Figure 11:
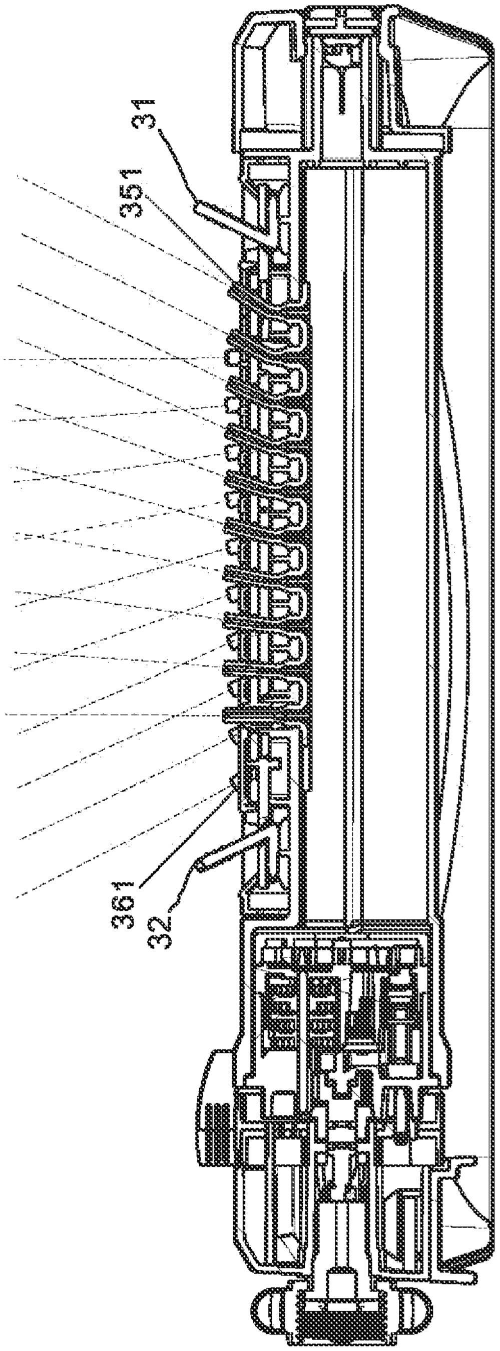
FIG. 11 is a sectional view of the second embodiment in FIG. 7 showing inclination angles and a spray pattern of nozzle sets at two sides according to the present invention.

Refer to FIG. 7 and FIG. 11, a second embodiment (II) is revealed. The first connecting member 33 and the second connecting member 34 are driven to move by the first the first push portion 31 and the second push portions 32 being operated and moved to the second position. Then the first pivot pin 332 and the second pivot pin 342 are pushed and moved to the position between the first end **372*a* and a second end 372*h* of the first guiding slot 372 and the position between the first end 382*a* and a second end 382*h* of the second guiding slot 382 respectively for synchronously driving the first guiding member 37 and the second guiding member 38 to move radially. At the moment, the first guiding member 37 and the second guiding member 38 drive the nozzles 351 and the nozzles 361 respectively to incline at an angle of 0-20 degrees with respect to a vertical plane in turn. The nozzles 351 and the nozzles 361** are inclined in opposite directions. Thereby the water sprayed out is fan-shaped and staggered, crossed each other at an angle of 20 degrees.

Figure 12:
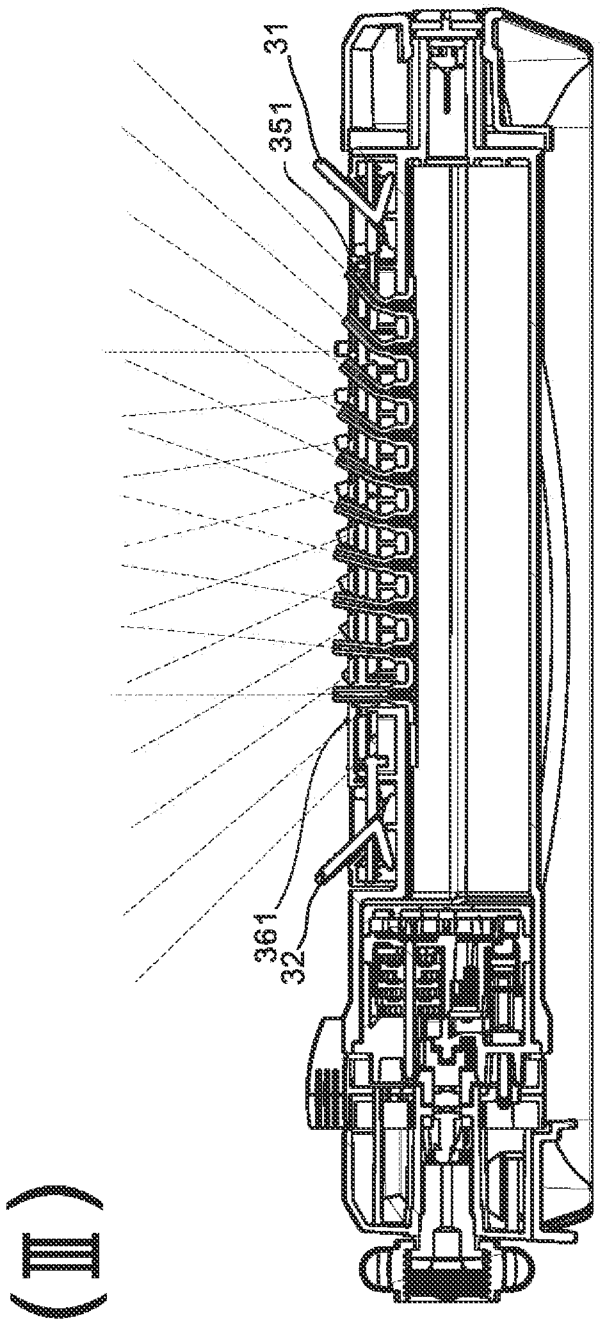
FIG. 12 is a sectional view of the third embodiment in FIG. 7 showing inclination angles and a spray pattern of nozzle sets at two sides according to the present invention.

Refer to FIG. 7 and FIG. 12, a third embodiment (III) is revealed. The first connecting member 33 and the second connecting member 34 are driven to move by the first the first push portion 31 and the second push portions 32 being operated and moved to the third position. Then the first pivot pin 332 and the second pivot pin 342 are pushed and moved to the second end 372*b* of the first guiding slot 372 and the second end 382*b* of the second guiding slot 382 respectively for synchronously driving the first guiding member 37 and the second guiding member 38 to move radially. At the moment, the first guiding member 37 and the second guiding member 38 drive the nozzles 351 and the nozzles 361 respectively to incline at an angle of 0-30 degrees with respect to a vertical plane in turn. The nozzles 351 and the nozzles 361 are inclined in opposite directions. Thereby the water jets are staggered and crossed each other at an angle of 30 degrees to form a fan-shaped pattern.

In summary, the present device has the following advantages:

1. By movement of the first push portion 31 and the second push portion 32 along the axis C of the tubular body 2 while being manually operated and pushed longitudinally, the first and second connecting members 33, 34 are also driven to move the first and second guiding members 37, 38 within the limited distance radially. Then at least one of the nozzles 351 and at least one of the nozzles 361 are selectively to be inclined with respect to the first longitudinal line A and the second longitudinal line B respectively and more in turn.

2. The first push portion 31 and the second push portion 32 can be moved to different positions with respect to an axis C of the tubular body 2 while being operated and pushed longitudinally and respectively so that the nozzle 351 and the nozzle 361 are inclined at different angles.

3. The first guiding slot 372 and the second guiding slot 382 are arranged slantwise at the surface of the first guiding member 37 and the second guiding member 38 respectively. Thus it's more labor saving for users while the first pivot pin 332 and the second pivot pin 342 are moved in the first guiding slot 372 and the second guiding slot 382 respectively for driving the first guiding member 37 and the second guiding member 38 to move radially.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A sprinkler comprising:

a tubular body, wherein at least one bushing is arranged at the tubular body; and a control assembly, mounted to the tubular body, comprising:

at least one nozzle set having a plurality of nozzles aligned in a row while one end of each of the plurality of nozzles is projecting from a surface of the tubular body;

at least one connecting member which is disposed on one end of the tubular body and capable of being moved within a limited distance, and having one end extended to form a pivot pin; and at least one guiding member having one end extended thereof pivotally mounted in the tubular body for being moved radially around an area where the guiding member is mounted to the tubular body, wherein the one end of the guiding member is provided with a pivot tube which is mounted in the bushing so that the guiding member is radially moved around the bushing which is used as a pivot point, wherein a guiding slot is formed by extension of the other end of the guiding member and a plurality of sliding slots aligned in a row, inclined and located between the two ends of the guiding member wherein the pivot pin is mounted in the guiding slot and capable of being moved in the guiding slot, wherein each of the plurality of nozzles is inserted into a corresponding one of the plurality of sliding slots and is capable of being selectively moved back and forth along the corresponding sliding slot, wherein the at least one connecting member is operated to move, and then the guiding member is pushed to move along the radial direction within a limited distance by movement of the pivot pin of the connecting member in the guiding slot, so that at least one of the plurality of nozzles is further pushed to incline selectively in turn, wherein the connecting member and the at least one of the plurality of nozzles move in the same direction.

2. The sprinkler as claimed in claim 1, wherein the guiding slot is arranged slantwise and located on one side of a central line of the guiding member in lengthwise direction.

3. The sprinkler as claimed in claim 1, wherein a push portion is disposed on the one end of the connecting member.

4. The sprinkler as claimed in claim 1, wherein the plurality of sliding slots aligned in a row is inclined at an angle and a length of each of the plurality of sliding slots is gradually increased in turn in one direction.

5. The sprinkler as claimed in claim 1, wherein the connecting member is moved in an axial direction of the tubular body.

6. A sprinkler comprising:

a tubular body; and a control assembly, which is mounted to the tubular body, comprising:

at least one nozzle set having a plurality of nozzles aligned in a row;

at least one push portion which is pivotally connected to the tubular body and capable of being moved longitudinally;

at least one connecting member mounted to the push portion and provided with a pivot pin; and at least one guiding member having one end extended thereof pivotally mounted in the tubular body for being moved radially around an area where the guiding member is mounted to the tubular body, wherein a guiding slot is formed by extension of the other end of the guiding member and a plurality of sliding slots aligned in a row and located between the two ends of the guiding member, wherein the pivot pin is pivotally mounted in the guiding slot and capable of being moved in the guiding slot, wherein each of the plurality of nozzles is inserted into a corresponding one of the plurality of sliding slots and is capable of being selectively moved back and forth along the corresponding sliding slot, wherein the at least one push portion is operated to move in an axial direction of the tubular body and drive the at least one connecting member to move, and then the guiding member is pushed to move along the radial direction within a limited distance by movement of the pivot pin of the connecting member in the guiding slot, so that at least one of the plurality of nozzles is further pushed to incline selectively in turn, wherein the push portion and the at least one of the plurality of nozzles move in the same direction, wherein at least one assembly portion and at least one abutting portion are extended from positions adjacent to at least one outer end of the tubular body and located adjacent to each other; at least one bushing is arranged at the tubular body and located adjacent to the assembly portion, wherein a plurality of assembly holes aligned in a row are extended from one end of the tubular body with the bushing to the other end of the tubular body; at least one pivot pin is extended from the push portion and the connecting member is provided with at least one locking slot; the push portion is inserted through the locking slot to be connected to the connecting member, wherein the pivot pin is pivotally connected to the assembly portion so that the push portion is radially rotated around the assembly portion which is as a pivot point; wherein the one end of the guiding member is provided with a first pivot tube which is mounted in the bushing so that the guiding member is radially moved around the bushing which is used as a pivot point, wherein a cover whose shape matches the tubular body is mounted to the tubular body for covering the tubular body; a plurality of mounting holes which are corresponding to the nozzles are formed on the cover so that the nozzles are inserted through and projecting from the holes; at least one end of the cover is provided with at least one receiving slot in which the push portion is mounted so that the push portion is capable of being moved in the receiving slot.

7. The sprinkler as claimed in claim 6, wherein the at least one push portion and the at least one connecting member are integrated into one part so that the at least one connecting member is capable of being operated to move longitudinally, wherein one end of the tubular body is provided with at least one track used in combination with the at least one connecting member so that the at least one connecting member is capable of being moved longitudinally in the at least one track.

8. The sprinkler as claimed in claim 6, wherein an active portion is formed on each of two sides of the push portion while a passive part is arranged under the connecting member and abutting against the active portion correspondingly, wherein the active portion is having a toothed curve while the passive part is having a toothed surface so that the active portion is engaged with the passive part for assistance in driving the connecting member to move back and forth when the push portion is moved.

9. The sprinkler as claimed in claim 6, wherein the guiding slot is arranged slantwise and located on one side of a central line of the guiding member in lengthwise direction.

10. The sprinkler as claimed in claim 6, wherein the sliding slots aligned in a row are inclined at an angle and a length of the respective sliding slots is gradually increased in turn in one direction.

* * * * *